Dec. 1, 1925.  1,564,120
J. E. BECKWITH
VEHICLE JACK
Filed June 8, 1925   2 Sheets-Sheet 2
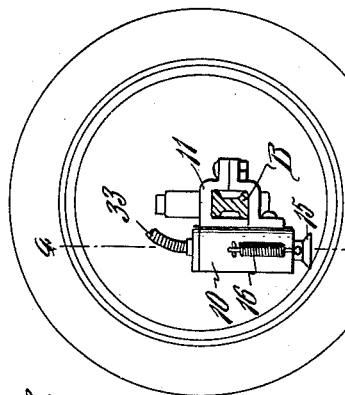
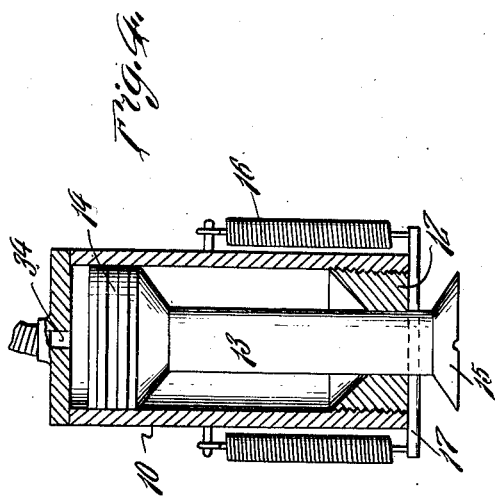
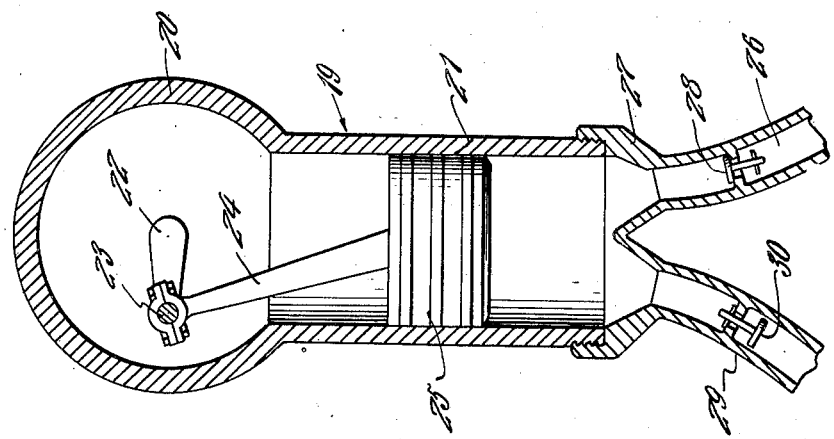
J.E.Beckwith
INVENTOR
BY Victor J. Evans
ATTORNEY Patented Dec. 1, 1925.

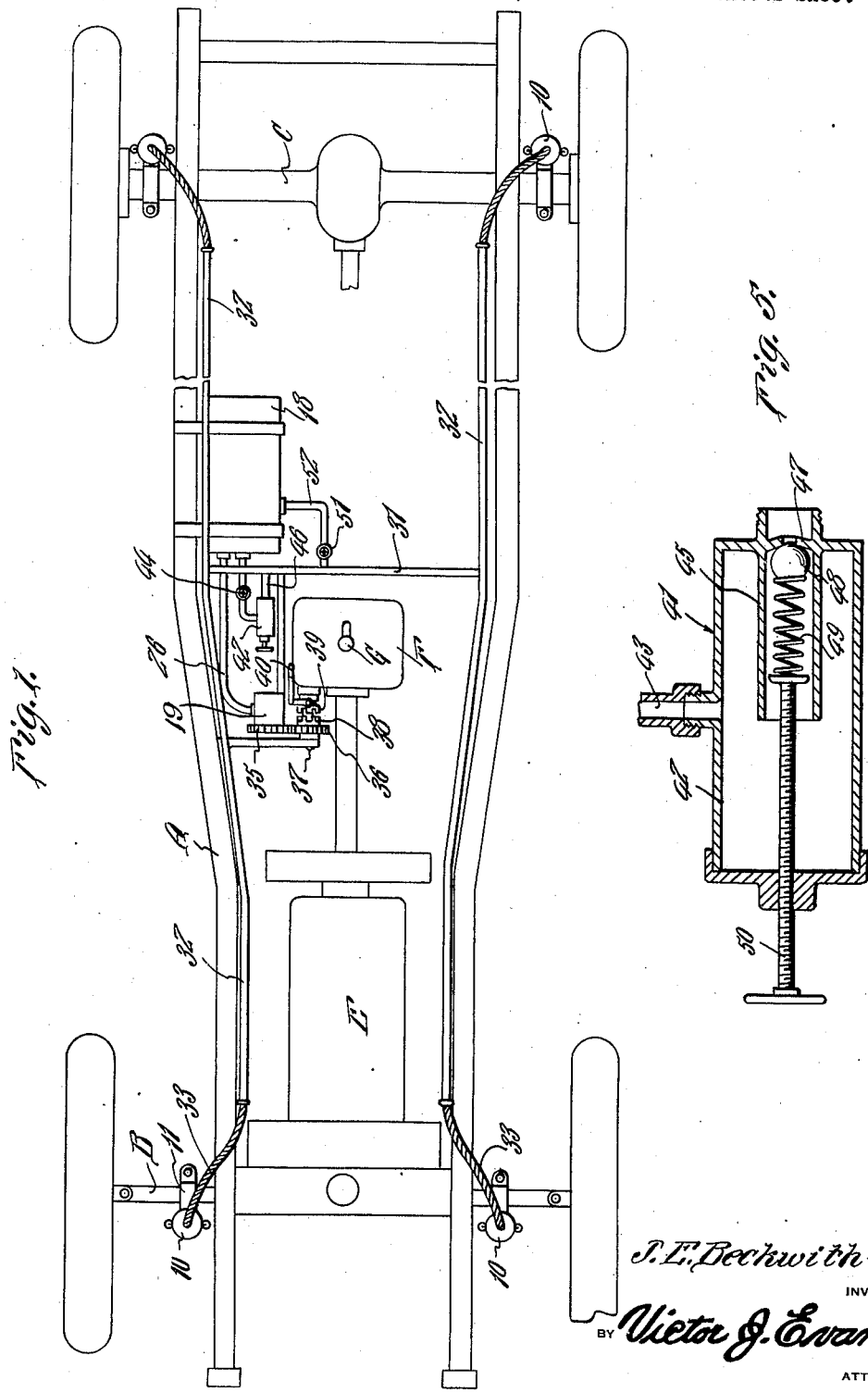

1,564,120

UNITED STATES PATENT OFFICE.

JAMES EARL BECKWITH, OF TAMPA, FLORIDA.

VEHICLE JACK.

Application filed June 8, 1925. Serial No. 35,756.

*To all whom it may concern:*

Be it known that I, JAMES E. BECKWITH, a citizen of the United States, residing at Tampa, in the county of Hillsborough and State of Florida, have invented new and useful Improvements in Vehicle Jacks, of which the following is a specification.

This invention relates to attachments or accessories for use in connection with motor vehicles and has for its object the provision of a jack device including a plurality of jack members carried by the axles and simultaneously operable by power taken from the vehicle engine for lifting the chassis and bringing the wheels thereof out of engagement with the ground so as to permit tire changing or any other work which needs to be done.

An important object is the provision of a device of this character utilizing a liquid for applying the necessary pressure to the jack devices, the liquid being circulated and distributed to the various jack members by a pump structure driven by the vehicle engine.

Another object is to provide an apparatus of this character in which the construction and arrangement are such that when the liquid within the jack members reaches a certain pressure it will be returned automatically to the tank, an adjustable by-pass structure being provided for this purpose.

An additional object is the provision of an apparatus of this character which will be simple and inexpensive to manufacture, easy to control and operate, positive in action, efficient and durable in service, and a general improvement in the art.

With the above and other objects and advantages in view, the invention consists in the details of construction and arrangement of parts to be hereinafter more fully described and claimed, and illustrated in the accompanying drawings in which:

Figure 1 is a plan view of a motor vehicle chassis equipped with the invention,

Figure 2 is a detail section through the pump,

Figure 3 is a cross sectional view through one of the axles showing a side elevation of one of the jacks thereon, Figure 4 is a vertical section through a jack, the view being taken on the line 4—4 of Figure 3, and Figure 5 is a detail section through the by-pass valve structure.

Referring more particularly to the drawings the letter A designates an automobile chassis including the usual frame mounted on front and rear axles B and C respectively. The letter E designates the engine with which is associated the usual transmission located within the transmission case F, the transmission including shiftable gears controlled by the ordinary handle or lever G.

In carrying out the invention I equip each axle with a pair of jack devices illustrated in detail in Figures 3 and 4. Each of these devices includes a cylinder 10 provided with a clamping structure or other equivalent device 11 embracingly engaged about and suitably secured to the axle. The cylinder is of course in upright position and its bottom is closed by a plug or other member 12 through which is slidable a plunger 13 terminating at its upper end in a piston 14 within the cylinder and having its lower end provided with a foot 15 adapted to be engaged with the ground or other surface as will be explained. The plunger 13 is normally maintained in elevated position as for instance by means of tension springs 16 mounted exteriorly of the cylinder and suitably connected thereto at one end and connected at their other ends with a transverse rod or the like 17 engaged with or passing through the plunger near the foot 15. As stated above there are two of these jack devices on each axle, one near each end thereof.

Mounted at any desired location on the chassis is a tank 18 containing liquid, preferably oil of suitable density and mounted at some other convenient location is a pump indicated generally at 19. While the actual structure of the pump may be anything preferred I have shown it as including a casing 20 and a cylinder 21. At the center of the casing is journaled a crank shaft 22 having a crank portion 23 with which is connected a connecting rod 24 carried by a piston 25 operating within the cylinder. Leading from the tank 18 is a pipe 26 which leads into a bottom cap or closure 27 for the pump cylinder and interposed in this pipe is an inwardly opening check valve 28. Leading from the cap 27 is a pipe 29 containing an outwardly opening check valve 30 and connected with a pipe 31 which is in turn connected with two pipes 32 located at opposite sides of the chassis. Connected with the ends of the pipes 32 are flexible tubes 33 which connect with nipples 34 in the upper ends of the jack cylinders 10.

In order that the pump may be driven, the crank shaft 22 may carry a gear 35 meshing with a gear 36 on a suitably journaled shaft 37 adapted to be rotated by the transmission mechanism of the vehicle. While the specific drive means is not illustrated, I have shown the gear 36 as carrying a clutch member 38 with which may be engaged a clutch member 39 shiftable by means of a fork device 40 under control of the handle or lever G, the specific connection not being shown. When these clutch elements are in engagement the gear 36 will be operated and will drive the pump so that oil will be taken from the tank and supplied to the jacks.

For maintaining pressure within the jacks and for preventing this pressure from becoming excessive, I preferably provide a by-pass device indicated generally at 41. This structure preferably includes a casing 42 with one side of which connects a pipe 43 leading to the tank 18 and preferably having interposed therein a cut-off valve 44 operable at will. Within the casing 42 is a sleeve or tubular member 45 with which is connected a pipe 46 in turn connected with the pipe 31. Within the member 45 is a valve seat 47 engaged by a ball or other valve 48 urged to its seat by a spring 49 which may be adjusted by means of a screw 50.

In the operation, it will be seen that when it is desired to jack up the vehicle the transmission clutch is disengaged, the transmission gearing thrown into neutral and the lever G or other means operated to engage the clutch members 38 and 39, subsequently to which the transmission clutch is re-engaged and the engine operated so that the pump will be driven. When the pump is in action it draws oil from the tank 18 through the pipe 26 and forces it out through the pipes 29, 31, 32 and 33 into the jack cylinders 10, thus forcing the pistons therein downwardly. When the pistons reach their lowered positions the foot members 15 will engage the ground or other surface and as the cylinders are attached to the vehicle axles it is obvious that continuing movement will result in lifting the vehicle to bring its wheels out of engagement with the ground. The jack members may not operate at the same speed but this is immaterial as eventually all the plungers will be moved to their lowermost positions. It is not necessary to discontinue operation of the pump as soon as the vehicle is lifted, for the reason that when the pressure within the line reaches a certain point the valve 48 will be unseated, permitting the oil to pass through the member 45 into the casing 42 and through the pipe 43 back to the tank. Adjustment as to pressure may be effected by varying the tension of the spring 49 by means of the screw 50. When it is desired to lower the vehicle to the ground, the pump is thrown out of operation and the valve 51 in the pipe 52 opened so that the oil in the system may return directly to the tank.

From the foregoing description and a study of the drawings it will be apparent that I have thus provided a simply constructed, inexpensive and easily installed mechanism by means of which all four of the wheels of a vehicle may be lifted off the ground at substantially the same time so that any necessary work may be performed. As the device is power operated it is bound to be a great convenience and saver of time, labor and annoyance.

While I have shown and described a preferred embodiment of the invention, it should be understood that I reserve the right to make such changes in the form, construction and arrangement of parts as will not depart from the spirit of the invention or the scope of the subjoined claim.

Having thus described the invention, I claim:

In an apparatus of the character described, hydraulic jacks mounted upon the axles of a vehicle, a liquid storage tank, a pump adapted to be driven by the transmission for supplying liquid to the jacks from the tank, and automatic pressure operated by-pass means including a casing connected with the tank, and a spring pressed valve structure within the casing connected with the line between the pump and the jacks.

In testimony whereof I affix my signature.

JAMES EARL BECKWITH.